United States Patent
Mitchell et al.

(10) Patent No.: US 8,799,174 B1
(45) Date of Patent: Aug. 5, 2014

(54) SYSTEMS AND METHODS FOR FACILITATING THE REUSE OF A CHILD WORKFLOW PROCESS BY MULTIPLE PARENT WORKFLOW PROCESSES

(75) Inventors: Jason J. Mitchell, Draper, UT (US); Marty Kurzinski, Jacksonville, FL (US); Richard Thomson, Salt Lake City, UT (US); Brian J. Kerr, Pleasant Grove, UT (US)

(73) Assignee: Crimson Corporation, Dover, DE (US)

( * ) Notice: Subject to any disclaimer, the term of this patent is extended or adjusted under 35 U.S.C. 154(b) by 1801 days.

(21) Appl. No.: 11/763,904

(22) Filed: Jun. 15, 2007

(51) Int. Cl.
*G06Q 99/00* (2006.01)
*G06Q 10/10* (2012.01)

(52) U.S. Cl.
CPC .................................. *G06Q 10/103* (2013.01)
USPC ........................................................ 705/301

(58) Field of Classification Search
USPC ........................................................ 705/301
See application file for complete search history.

(56) References Cited

U.S. PATENT DOCUMENTS

| | | | | |
|---|---|---|---|---|
| 5,734,837 A * | 3/1998 | Flores et al. | | 705/7 |
| 6,073,109 A * | 6/2000 | Flores et al. | | 705/8 |
| 6,119,149 A * | 9/2000 | Notani | | 709/205 |
| 6,151,623 A * | 11/2000 | Harrison et al. | | 709/206 |
| 6,332,155 B1 * | 12/2001 | Notani | | 709/205 |
| 6,397,192 B1 * | 5/2002 | Notani et al. | | 705/9 |
| 7,168,077 B2 * | 1/2007 | Kim et al. | | 718/106 |
| 7,177,929 B2 * | 2/2007 | Burbeck et al. | | 709/224 |
| 7,426,548 B2 * | 9/2008 | Griffin et al. | | 709/219 |
| 7,451,432 B2 * | 11/2008 | Shukla et al. | | 717/106 |
| 7,729,928 B2 * | 6/2010 | Backhaus et al. | | 705/2 |
| 7,739,243 B2 * | 6/2010 | Erickson et al. | | 707/681 |
| 2003/0074342 A1 * | 4/2003 | Curtis | | 707/1 |
| 2003/0149714 A1 * | 8/2003 | Casati et al. | | 709/100 |
| 2003/0191769 A1 * | 10/2003 | Crisan et al. | | 707/100 |
| 2003/0225728 A1 * | 12/2003 | Moura | | 707/1 |
| 2004/0078776 A1 * | 4/2004 | Moon et al. | | 717/101 |
| 2004/0111302 A1 * | 6/2004 | Falk et al. | | 705/4 |
| 2004/0225730 A1 * | 11/2004 | Brown et al. | | 709/224 |
| 2004/0236651 A1 * | 11/2004 | Emde et al. | | 705/34 |
| 2004/0236660 A1 * | 11/2004 | Thomas et al. | | 705/37 |
| 2006/0195339 A1 * | 8/2006 | Backhaus et al. | | 705/2 |
| 2007/0094248 A1 * | 4/2007 | McVeigh et al. | | 707/4 |
| 2009/0013255 A1 * | 1/2009 | Yuschik et al. | | 715/728 |

OTHER PUBLICATIONS

"Introducing Microsoft Windows Workflow Foundation: An Early Look," http://msdn2.microsoft.com/en-us/library/aa480215(d=printer).aspx, Aug. 29, 2007.
"BizTalk Server 2006 Product Overview," http://www.microsoft.com/technet/prodtechnol/biztalk/2006/evaluate/overview/default.mspx, Aug. 29, 2007.
"New webMethods Fabric™ 7 for Business Process Integration," http://www.webmethods.com/fabric, Aug. 29, 2007.

(Continued)

*Primary Examiner* — Traci Casler
(74) *Attorney, Agent, or Firm* — Austin Rapp & Hardman

(57) ABSTRACT

A business process management system may include a parent workflow process and a child workflow process. The parent workflow process may include a call to the child workflow process. The business process management system may also include a workflow engine that is configured to execute the parent workflow process and the child workflow process, and that is configured to determine an undefined characteristic of the child workflow process with reference to data that corresponds to the parent workflow process.

11 Claims, 7 Drawing Sheets

(56) References Cited

OTHER PUBLICATIONS

"LANDesk Process Manager," http://www.landesk.com/Products/BPM/, Aug. 29, 2007.

"Heat Business Process Management," http://www.frontrange.com/common/Files/Downloads/Product_Literature/ITSM_Literature/ITSM_HEAT_Brochure_NA_EN.pdf, Aug. 29, 2007.

* cited by examiner

SYSTEMS AND METHODS FOR FACILITATING THE REUSE OF A CHILD WORKFLOW PROCESS BY MULTIPLE PARENT WORKFLOW PROCESSES

TECHNICAL FIELD

The present disclosure relates generally to computers and computer-related technology. More specifically, the present disclosure relates to systems and methods for facilitating the reuse of a child workflow process by multiple parent workflow processes.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. These computers are often interconnected to form a computer network. As is often the case, a single server or core server is responsible for managing other computers. The managed computers are often referred to as nodes. A computer network may have hundreds or even thousands of managed nodes.

Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly, computer software is also frequently upgraded or replaced. New computer hardware and software is continually being integrated into systems across the world.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

DETAILED DESCRIPTION

Figure 1:
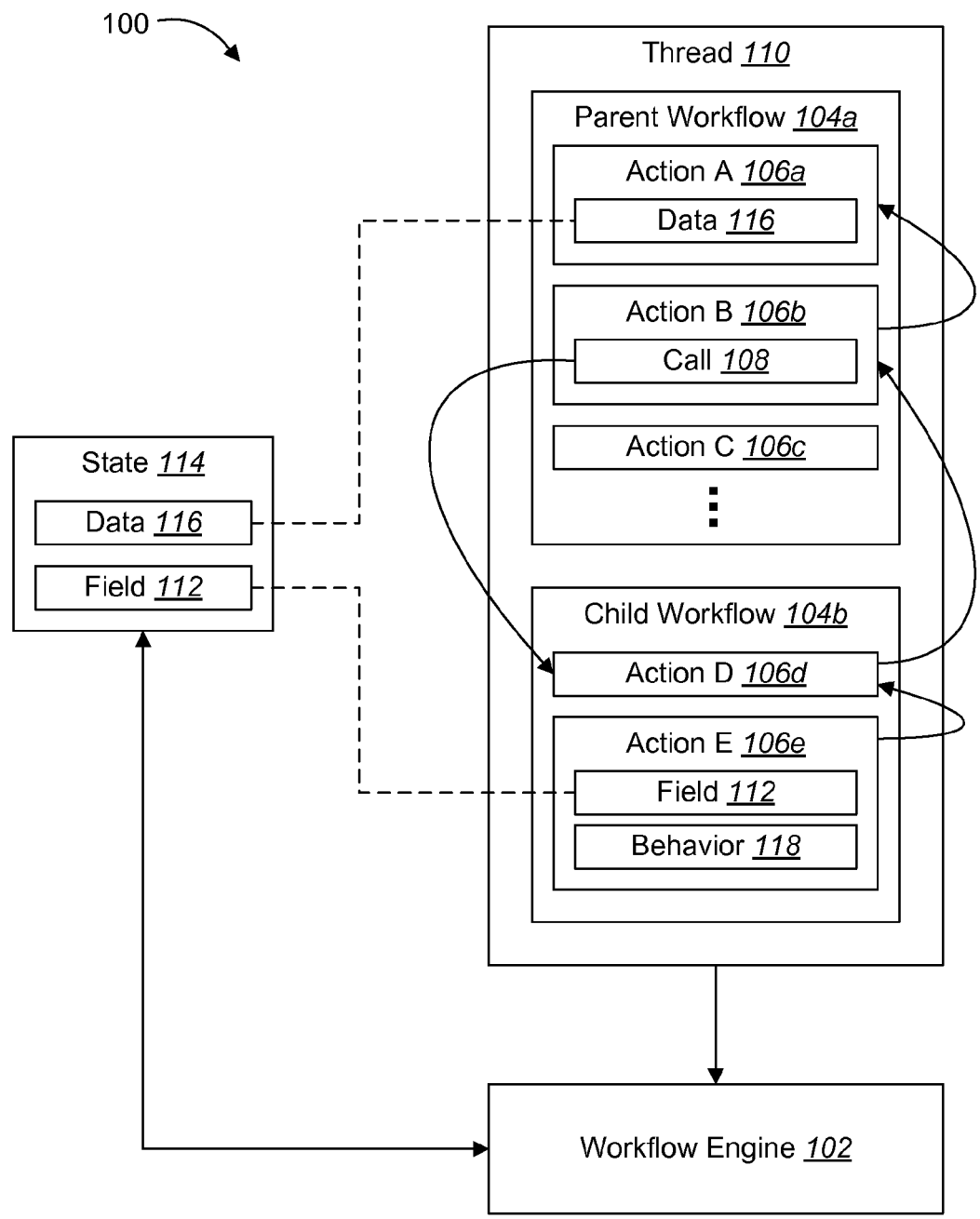
FIG. 1 illustrates some components within a business process management (BPM) system in which embodiments may be practiced.

A business process management system is disclosed. The business process management system may include a parent workflow process and a child workflow process. The parent workflow process may include a call to the child workflow process. The business process management system may also include a workflow engine that is configured to execute the parent workflow process and the child workflow process. The workflow engine may also be configured to determine an undefined characteristic of the child workflow process with reference to data that corresponds to the parent workflow process. As one example, the characteristic may be a value of a field. As another example, the characteristic may be a behavior of an action.

Execution of the parent workflow process and the child workflow process may occur within a thread of execution, and determining the undefined characteristic of the child workflow process may include traversing the thread of execution in a reverse direction until the data is located that allows the undefined characteristic of the child workflow process to be defined. The data may correspond to an action within the parent workflow process. The workflow engine may be configured to use the data to define the characteristic of the child workflow process.

The workflow engine may be configured so that, upon locating the data, the workflow engine searches for additional data corresponding to one or more other actions that are positioned at a same level of the parent workflow process, and uses the additional data to define the characteristic of the child workflow process.

The business process management system may also include a workflow core. The parent workflow process, the child workflow process, and the workflow engine may be located on the workflow core. The business process management system may also include a plurality of core servers in electronic communication with the workflow core, and a plurality of nodes in electronic communication with the core servers.

A method for facilitating the reuse of a child workflow process with multiple parent workflow processes is also disclosed. During execution of the child workflow process within a thread of execution, the method may include determining that a characteristic of the child workflow process is undefined. In response, the method may include traversing the thread of execution in a reverse direction until data that allows the characteristic to be defined is located. The method may also include using the data to define the characteristic of the child workflow process.

A computer-readable medium comprising instructions is also disclosed. During execution of a child workflow process within a thread of execution, the instructions may be executable to determine that a characteristic of the child workflow process is undefined. In response, the instructions may be executable to traverse the thread of execution in a reverse direction until data that allows the characteristic to be defined is located. The instructions may also be executable to use the data to define the characteristic of the child workflow process.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

FIG. 1 illustrates some components within a business process management (BPM) system 100 in which embodiments may be practiced. The BPM system 100 is shown with a workflow engine 102 that executes workflow processes 104. A workflow process 104 may be referred to herein simply as a workflow 104.

A workflow 104 may include a series of actions 106. The term "action" 106, as used herein, should be interpreted broadly to encompass any set of one or more steps that may be performed by a workflow engine 102. Typically, the actions 106 within a workflow 104 are organized so as to implement a business process that has been defined for an organization.

One workflow 104 may include a call 108 to another workflow 104. The term "parent workflow" 104a may be used to describe a workflow 104a that includes a call 108 to another workflow 104b, while the term "child workflow" 104b may be used to describe a workflow 104b that is called by another workflow 104a.

A workflow 104 may be thought of as a series of instructions. Thus, a workflow engine 102 executes a workflow 104 by executing the instructions that comprise the workflow 104. The instructions that are executed by the workflow engine 102 may be referred to as a thread of execution 110, or simply as a thread 110.

When the workflow engine 102 is executing a workflow 104a and encounters a call 108 to another workflow 104b, the workflow engine 102 temporarily stops executing the workflow 104a that includes the call 108 (the parent workflow 104a) and begins executing the workflow 104b that is called (the child workflow 104b). A workflow engine 102 does not necessarily identify a particular instruction as belonging to either a parent workflow 104a or a child workflow 104b. Instead, a workflow engine 102 may just see a series of instructions that it executes. However, from a logical standpoint, the execution of a thread 110 may include a call 108 from a parent workflow 104a to a child workflow 104b, as shown in FIG. 1.

As the workflow engine 102 executes a thread 110, the workflow engine 102 may maintain the state 114 of the thread 110, i.e., the current or last-known status or condition of certain aspects of the thread 110. The state 114 of the thread 110 may include information such as the value of certain fields 112. The state 114 of the thread 110 may also include other data 116. The fields 112 and the data 116 may be utilized by actions 106 that are part of the executing workflow(s) 104.

The techniques disclosed herein permit certain characteristics of the actions 106 within a child workflow 104b to be defined during the execution of the child workflow 104b based on the design of the parent workflow 104a and/or based on the current state 114 of the thread 110. In accordance with the present disclosure, the workflow engine 102 may be configured so that whenever it encounters a characteristic of a workflow 104 that is not defined, the workflow engine 102 traverses the executing thread 110 in a reverse direction until it finds data 116 that allows the undefined characteristic of the workflow 104 to be defined. The workflow engine 102 may then use this data 116 to define the characteristic 112 of the workflow 104, and execution of the thread 110 may continue from the point where it previously left off. In this way, the workflow engine 102 may determine an undefined characteristic of a child workflow process 104b with reference to data 116 that corresponds to the calling parent workflow process 104a.

An example will now be discussed in relation to FIG. 1. The workflow engine 102 may execute the parent workflow 104a by first performing action A 106a, then action B 106b, then action D 106d (because action B 106b includes a call 108 to the child workflow 104b, which starts with action D 106d), and then action E 106e. If the workflow engine 102 determines that some characteristic of action E 106e is undefined, it may then go back to the previous action 106 that was performed, action D 106d, and determine whether action D 106d provides data 116 that allows the undefined characteristic of action E 106e to be defined. After determining that action D 106d does not provide such data 116, the workflow engine 102 may then go back one action 106 farther in the thread 110, namely to action B 106b, and determine whether action B 106b provides such data 116. This may be repeated until the workflow engine 102 finds an action 106 that provides such data 116, which in this example is action A 106a. The workflow engine 102 may then use the data 116 that is provided by action A 106a to define the characteristic of action E 106e, and execution of the thread 110 may continue from the point where it left off (i.e., by completing action E 106e).

Because characteristics of a child workflow process 104b may be defined with reference to data 116 that corresponds to the calling parent workflow process 104a, a child workflow process 104b may be reused with multiple parent workflow processes 104a. In other words, the same child workflow process 104b may be called by multiple different parent workflow processes 104a. Characteristics of the child workflow process 104b may be defined differently for different parent workflow processes 104a. In this way, a child workflow process 104b may be viewed as a template that may be reused by multiple parent workflow processes 104a.

One example of a characteristic that may be defined in the manner described above is a field 112. As used herein, the term field 112 refers to a variable, i.e., a unit of data whose value can change. An action 106 in a workflow 104 may include the use of a field 112. For example, the value of a field 112 may be used to evaluate a condition, to determine the set of objects for which an action 106 is performed, etc.

In accordance with the present disclosure, when the workflow engine 102 reaches a point in the workflow 104 where a field 112 having an undefined value is evaluated, the workflow engine 102 may determine the value of the field 112 by traversing the executing thread 110 in a reverse direction until it finds data 116 that allows the value of the field 112 to be defined. The workflow engine 102 may then use this data 116 to set the value of the field 112, and execution of the thread 110 may continue from the point where it previously left off.

This characteristic of the workflow engine 102 permits the values of fields 112 that are utilized by actions 106 within a child workflow 104b to be defined during the execution of the child workflow 104b based on the design of the parent workflow 104a and/or based on the current state 114 of the thread 110. Such fields 112 may be thought of as algorithmic fields 112, in that their values may be set dynamically, based on a policy that is enforced by the workflow engine 102. A child workflow 104b that is designed in this way can be called by multiple different parent workflows 104a. The value of a particular field 112 may change depending on which parent workflow 104a calls the child workflow 104b.

Another example of a characteristic that may be defined in the manner described above is the behavior 118 of an action 106. Before discussing this example, however, a brief discussion will be provided about what the term behavior 118 means in relation to an action 106. As indicated above, an action 106 may refer to any set of one or more steps that may be performed by a workflow engine 102. The behavior 118 of an action may refer to the aspect(s) of an action 106 that may change as the action 106 is performed multiple times under different circumstances.

Consider the example of an action 106 that involves determining whether certain approvals have been obtained. Multiple workflows 104 may include the action 106 of determining whether approvals have been obtained, but the specific approvals that should be checked may be different for different workflows 104. Thus, in this example, it may be said that the behavior 118 of the action 106 includes the specific approvals that should be checked.

In accordance with the present disclosure, when the workflow engine 102 reaches a point in a workflow 104 where an action 106 having an undefined behavior 118 is to be carried out, the workflow engine 102 may determine the behavior 118 of the action 106 by traversing the executing thread 110 in a reverse direction until it finds data 116 that allows the behavior 118 of the action 106 to be defined. The workflow engine 102 may then use this data 116 to define the behavior 118 of the action 106, and execution of the thread 110 may continue from the point where it previously left off.

This characteristic of the workflow engine 102 permits the behavior 118 of actions 106 within a child workflow 104b to be defined during the execution of the child workflow 104b based on the design of the parent workflow 104a and/or based on the current state 114 of the thread 110. Such actions 106 may be thought of as algorithmic actions 106, in that their behavior 118 may be set dynamically, based on a policy that is enforced by the workflow engine 102. A child workflow 104b that is designed in this way can be called by multiple different parent workflows 104a. The behavior 118 of an action 106 may change depending on which parent workflow 104a calls the child workflow 104b.

Figure 2:
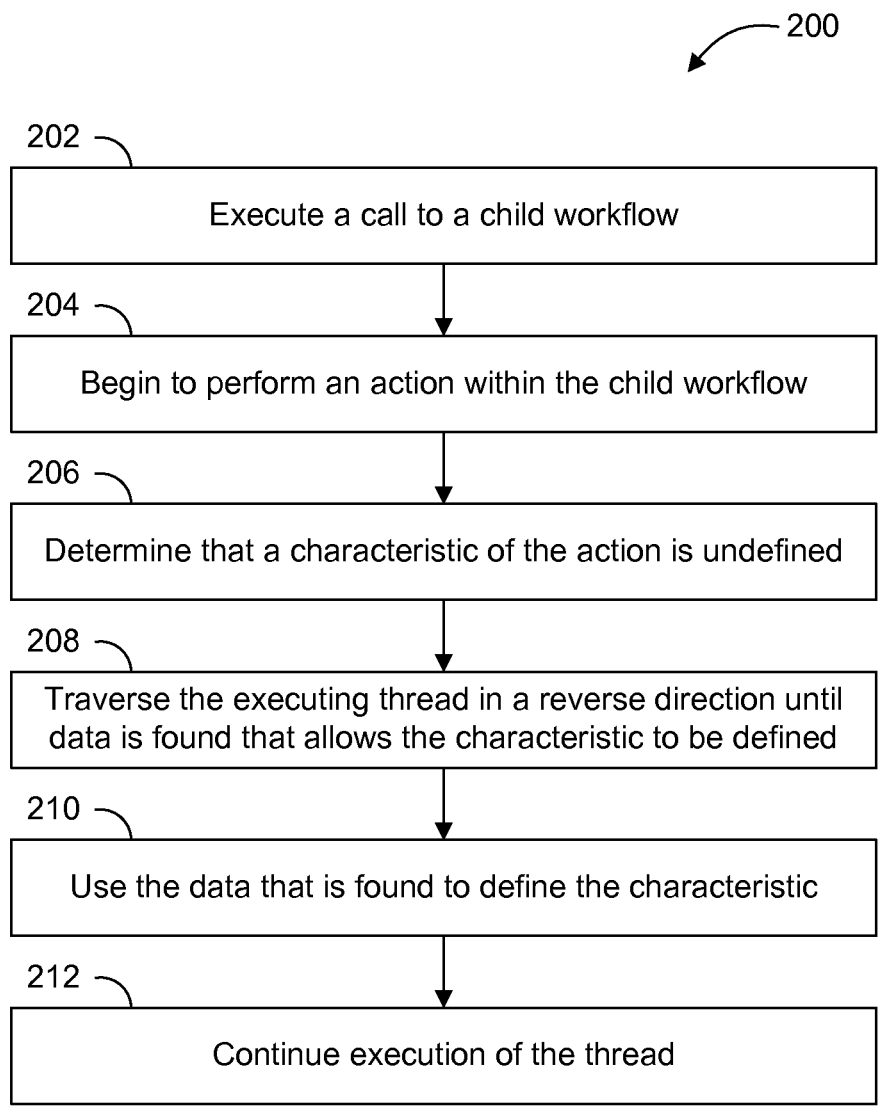
FIG. 2 illustrates a method for facilitating the reuse of a child workflow process with multiple parent workflow processes.

FIG. 2 illustrates a method 200 for facilitating the reuse of a child workflow process 104b with multiple parent workflow processes 104a. The depicted method 200 may be implemented by a workflow engine 102.

At some point during the execution of a workflow 104a (a parent workflow 104a), the workflow engine 102 may execute 202 a call 108 to another workflow 104b (a child workflow 104b). As stated above, the workflow engine 102 executes workflows 104 by executing the instructions that comprise the workflows 104, and the workflow engine 102 does not necessarily identify a particular instruction as belonging to either a parent workflow 104a or a child workflow 104b. However, from a logical standpoint, the operation of the workflow engine 102 may be described as executing 202 a call 108 to a child workflow 104b. In response, the workflow engine 102 temporarily stops executing the parent workflow 104a and begins executing the child workflow 104b.

At some point during execution of the child workflow 104b, the workflow engine 102 may begin 204 to perform an action 106 within the child workflow 104b that includes a characteristic (e.g., a field 112, a behavior 118, etc.) that is undefined. In response to determining 206 that the characteristic is undefined, the workflow engine 102 may traverse 206 the executing thread 110 in a reverse direction until it finds an action 106 that provides data 116 that allows the characteristic 112 to be defined. The workflow engine 102 may then use 208 the data 116 that it finds to define the characteristic of the workflow 104 (e.g., set the value of the field 112, determine the behavior 118 of the action 106, etc.), and execution of the thread 110 may continue 210 from the point where it previously left off.

Figure 3:
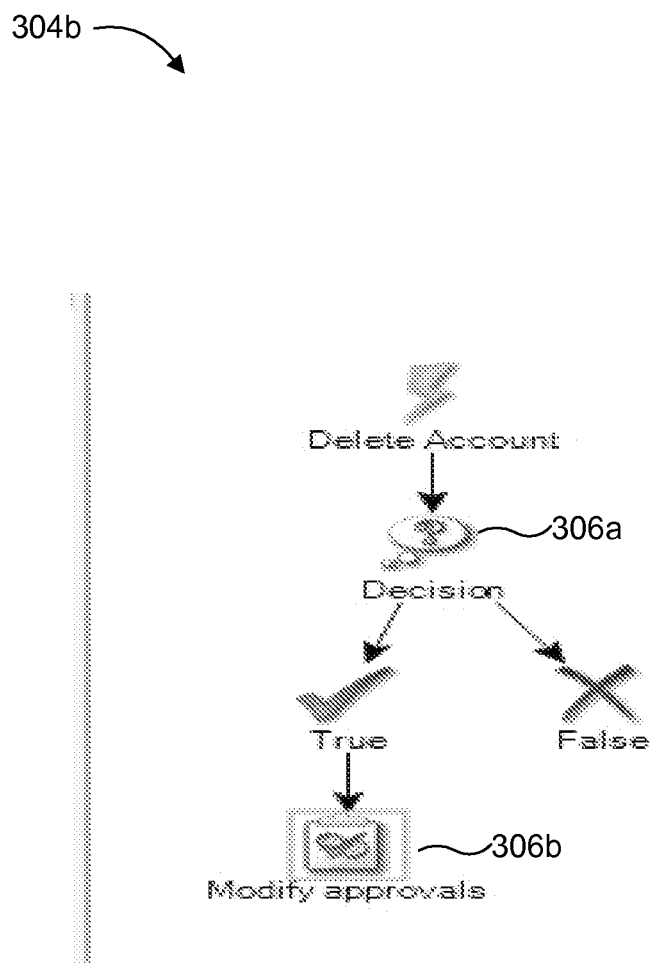
FIG. 3 illustrates an example of a workflow that may be executed by a workflow engine.

FIG. 3 illustrates an example of a workflow 304b that may be executed by a workflow engine 102. The workflow 304b may be called by another workflow 304a, and thus it will be referred to in the discussion below as a child workflow 304b.

The child workflow 304b that is shown in FIG. 3 includes two actions 306a, 306b. As will be discussed immediately below, both of these actions 306a, 306b include behavior 118 that may be defined during the execution of the child workflow 304b based on the design of the parent workflow 104a and/or based on the current state 114 of the executing thread 110.

The first action 306a involves making a decision. The decision may be made by evaluating a condition, for example, whether all approvals have been completed. In this example, the data 116 that facilitates the evaluation of the condition—namely, which approvals have been created, and information about which of these approvals have been completed—is not available during the creation of the workflow 304b. Thus, the behavior 118 of this first action 306a may be left undefined when the workflow 304b is created.

The second action 306b involves modifying approvals. It may not be possible and/or efficient for the approvals that are to be modified to be defined when the workflow 304b is created. Thus, the behavior 118 of this second action 306b may also be left undefined when the workflow 304b is created.

Figure 4:
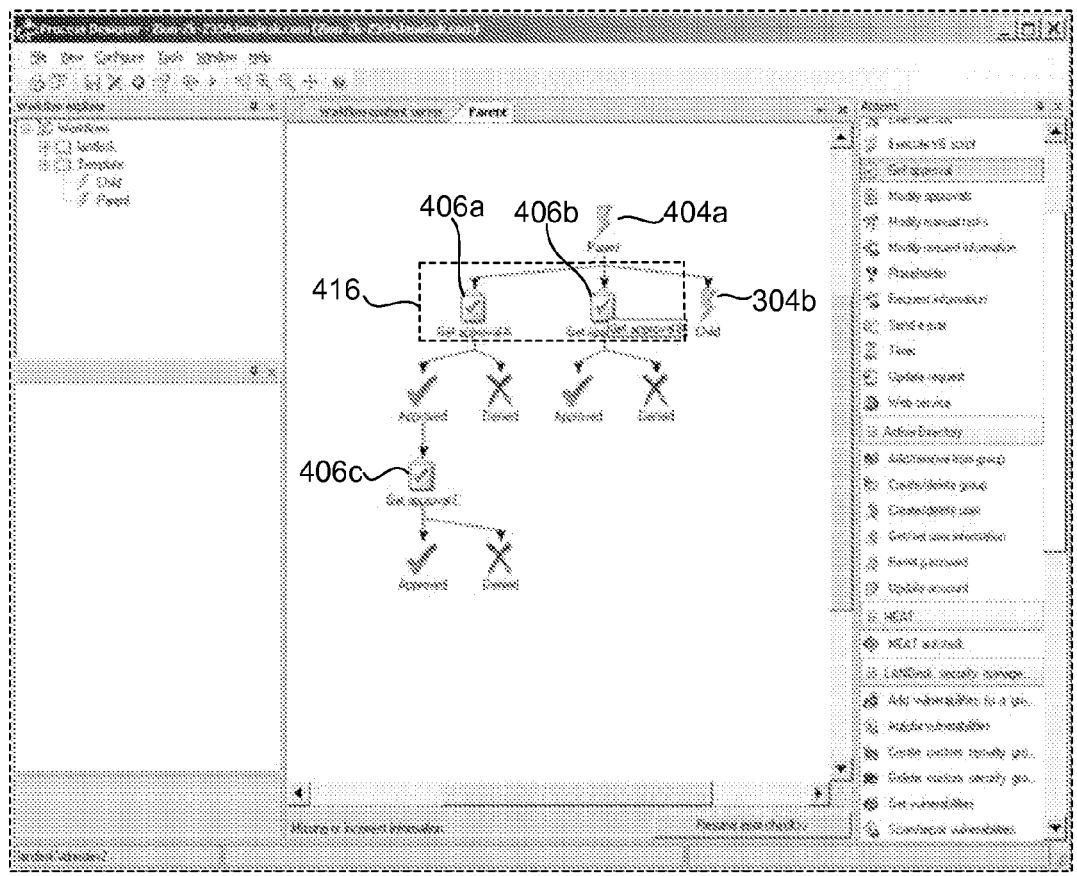
FIG. 4 illustrates an example of a parent workflow that may call the child workflow that is shown in FIG. 3.

FIG. 4 illustrates an example of a parent workflow 404a that may call the child workflow 304b that is shown in FIG. 3. The parent workflow 404a includes three actions 406a, 406b, 406c. The first action 406a involves getting approval A, the second action 406b involves getting approval B, and the third action 406c involves getting approval C.

The organization of the parent workflow 404a shown in FIG. 3 is represented hierarchically, as a tree structure. The actions 406a, 406b, 406c of the workflow 404a are not all on the same level of the workflow 404a. The first and second actions 406a, 406b are on the same level as each other (approvals A and B may be thought of as "sister" approvals) and as the call to the child workflow 304*b*. The third action 406*c* is on a lower level than the first and second actions 406*a*, 406*b* and the call to the child workflow 304*b*.

Referring to FIGS. 3 and 4 collectively, an explanation will now be provided concerning how the workflow engine 102 may define the behavior 118 of the actions 306*a*, 306*b* within the child workflow 304*b* if the child workflow 304*b* is called by the parent workflow 404*a*. For clarity in this discussion, actions 306 that are part of the child workflow 304*b* will be referred to as child actions 306, and actions 406 that are part of the parent workflow 404*a* will be referred to as parent actions 406.

In this example, when the workflow engine 102 reaches the first child action 306*a*, the workflow engine 102 recognizes that it needs to determine whether all of the approvals have been completed in order to be able to perform this action 306*a* (i.e., the behavior 118 of the first child action 306*a* is undefined). In response, the workflow engine 102 may return to the level of the parent workflow 304*a* that includes the first and second parent actions 406*a*, 406*b*. There, the workflow engine 102 may determine whether approval A was obtained and whether approval B was obtained (this is the data 416 that permits the behavior 118 of the first child action 306*a* to be defined).

If both approval A and approval B were obtained, then the result of the decision corresponding to the first child action 306*a* is true, and the workflow engine 102 would proceed to the second child action 306*b*, which involves modifying approvals. If the specific approvals to be modified are not defined as part of the second child action 306*b*, then the workflow engine 102 may return to the level of the parent workflow 404*a* that includes the first and second parent actions 406*a*, 406*b*. There, the workflow engine 102 may determine that approval A and approval B should be modified.

As this example demonstrates, when the workflow engine 102 is traversing the executing thread 110 in a reverse direction and it finds data 416 that would allow the relevant characteristic of a child action 306 to be defined, the workflow engine 102 may use all of the data 416 that is available on that level. In other words, once data 416 corresponding to a particular action 416 of the parent workflow 404*a* is located, the workflow engine 102 may then search for additional data 416 corresponding to one or more other actions 406 that are positioned at the same level of the parent workflow 404*a*. This is why, in the example just described, the workflow engine 102 determines that the relevant data 416 for defining the behavior 118 of the first child action 306*a* is whether approval A was obtained and whether approval B was obtained, but not whether approval C was obtained. The parent action 406*c* of obtaining approval C is not on the same level as the parent actions 406*a*, 406*b* of obtaining approval A and obtaining approval B. This is also why the workflow engine 102 determines that the approvals to be modified as part of executing the second child action 306*b* are approval A and approval B, but not approval C.

Figure 5:
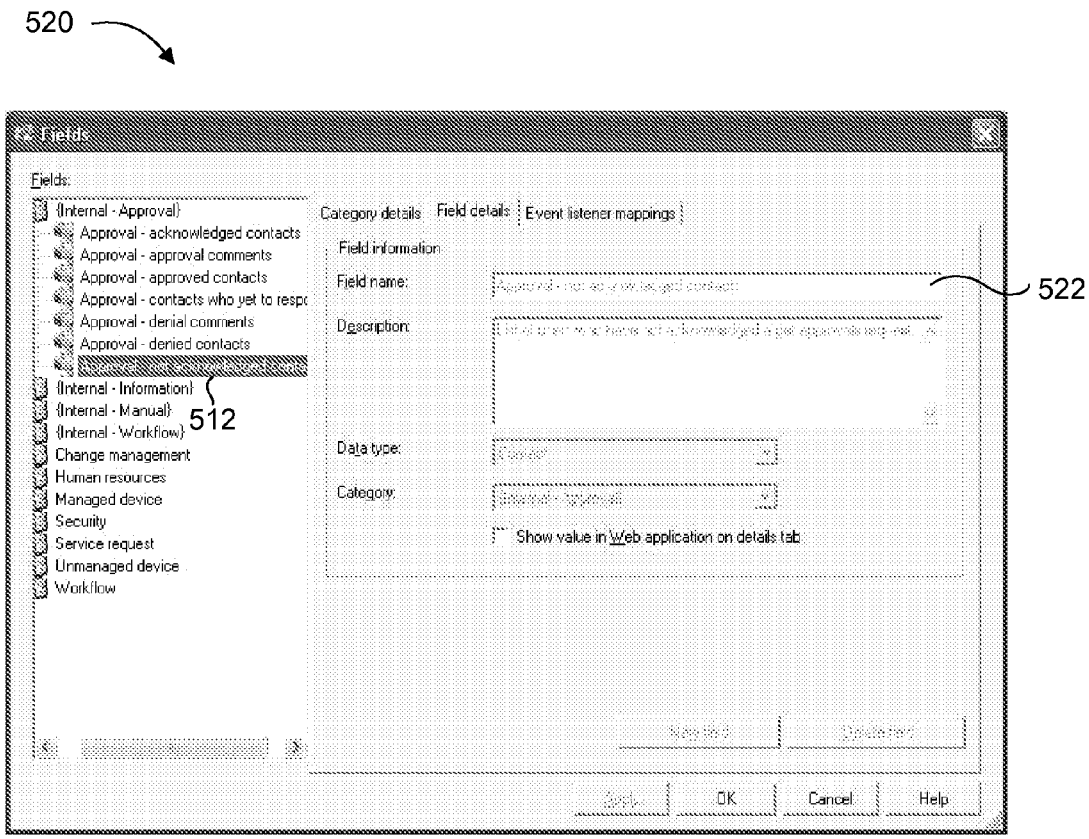
FIG. 5 illustrates an example of a field that may be defined for a workflow.

FIG. 5 illustrates an example of a field 512 that may be defined for a workflow 104. The field name 522 is "Approval—not acknowledged contacts." This field 512 may be made available to use in any of the actions 106 that included within a workflow 104. However, instead of allowing the user to set the value of the field 512, it is defined and set by the workflow engine 102 during runtime in the manner described above.

Figure 6:
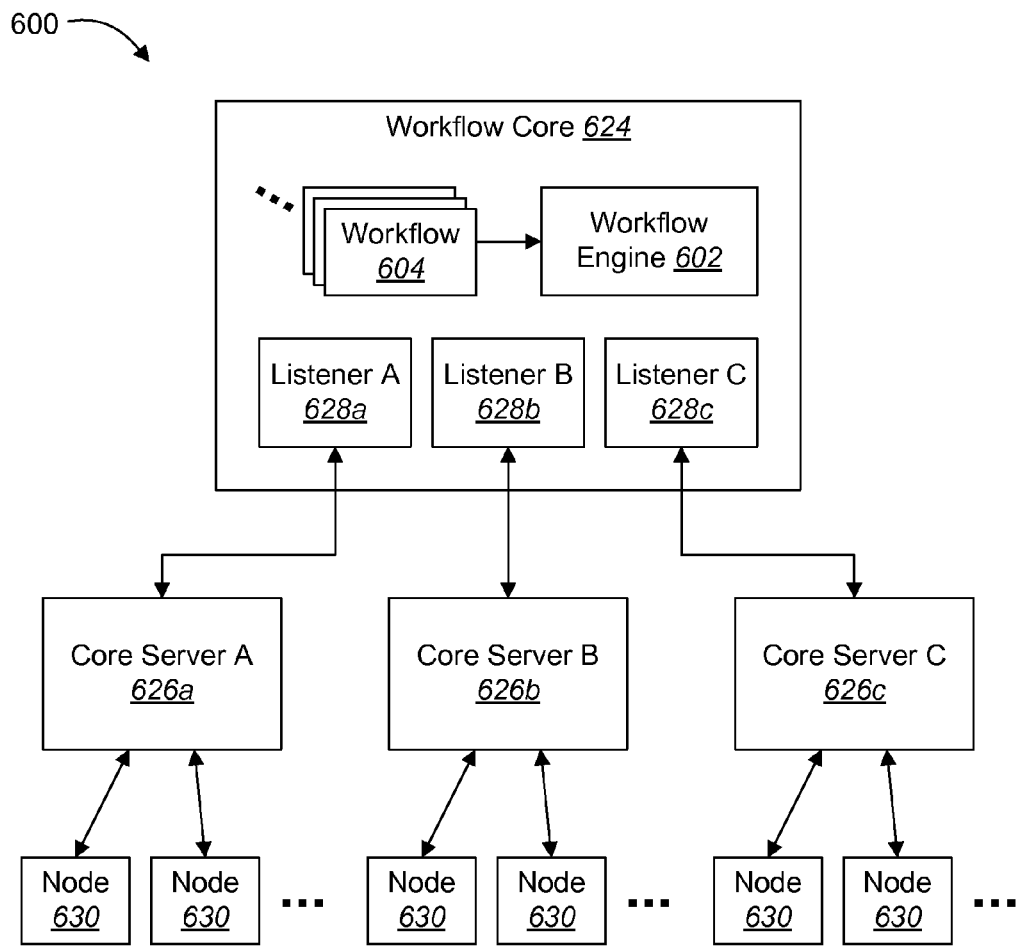
FIG. 6 illustrates components within a BPM system in which embodiments may be practiced.

FIG. 6 illustrates components within a BPM system 600 in which embodiments may be practiced. The BPM system 600 is shown with a workflow core 624. The workflow core 602 is shown with a workflow engine 602 that executes workflows 604. The workflow engine 602 may be configured to operate in the manner described above, i.e., whenever the workflow engine 602 encounters a characteristic of a workflow 604 that is not defined, the workflow engine 602 may traverse the executing thread 110 in a reverse direction until it finds data 116 that allows the undefined characteristic of the workflow 604 to be defined.

The BPM system 600 is also shown with multiple core servers 626*a*, 626*b*, 626*c*. Each core server 626 may be used to manage other computer systems that are in electronic communication with the core server 626. These other computer systems may be referred to as managed nodes 630, or simply as nodes 630. A core server 626 may manage a single node 630 or a core server 626 may manage a plurality of nodes 630.

Listeners 628*a*, 628*b*, 628*c* may also be provided. The listeners 628 may monitor the core servers 626 for the purpose of detecting events that trigger the execution of particular workflows 604.

Figure 7:
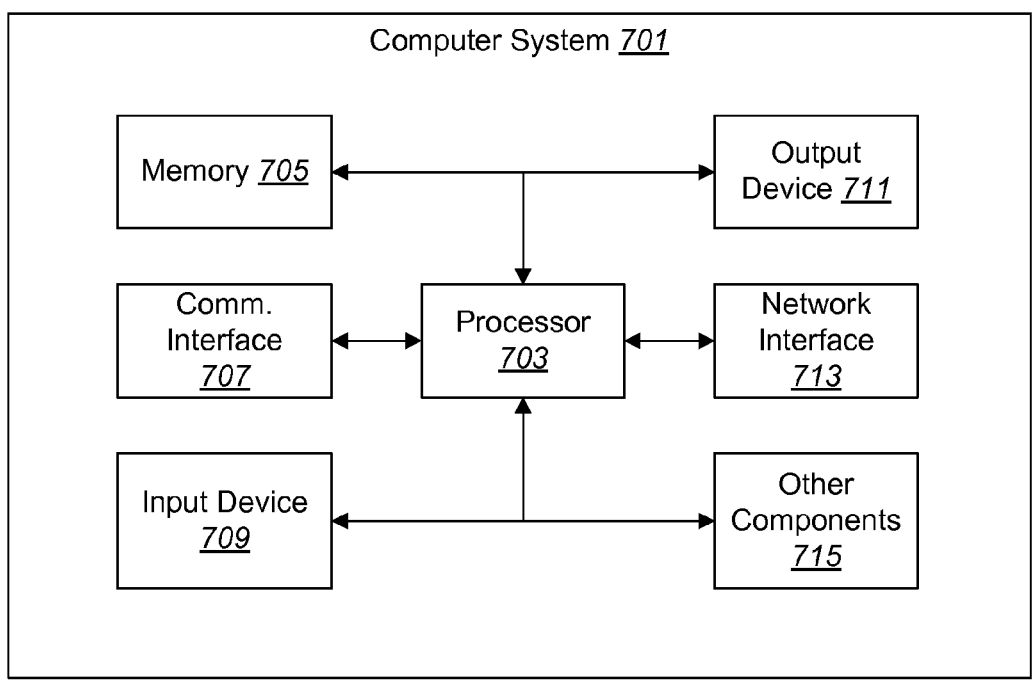
FIG. 7 illustrates various components that may be utilized in a computer system.

FIG. 7 illustrates various components that may be utilized in a computer system 701. The illustrated components may be located within the same physical structure or in separate housings or structures.

The computer system 701 is shown with a processor 703 and memory 705. The processor 703 may control the operation of the computer system 701 and may be embodied as a microprocessor, a microcontroller, a digital signal processor (DSP) or other device known in the art. The processor 703 typically performs logical and arithmetic operations based on program instructions stored within the memory 705. The instructions in the memory 705 may be executable to implement the methods described herein.

The computer system 701 may also include one or more communication interfaces 707 and/or network interfaces 713 for communicating with other electronic devices. The communication interface(s) 707 and the network interface(s) 713 may be based on wired communication technology, wireless communication technology, or both.

The computer system 701 may also include one or more input devices 709 and one or more output devices 711. The input devices 709 and output devices 711 may facilitate user input. Other components 715 may also be provided as part of the computer system 701.

FIG. 7 illustrates only one possible configuration of a computer system 701. Various other architectures and components may be utilized.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limiting the scope of the claims.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A computing device that implements a business process management system, comprising:
   a processor;
   memory in electronic communication with the processor;
   a parent workflow process stored in the memory;
   a child workflow process stored in the memory, wherein the parent workflow process includes a call to the child workflow process, wherein the parent workflow process comprises a first action and a second action, wherein the child workflow process comprises a third action and a fourth action, and wherein the actions are executed initially in the order of the first action, the second action, the third action and then the fourth action; and
   a workflow engine that is configured to execute within a thread of execution the parent workflow process and the child workflow process, and that is configured to determine an undefined characteristic of the child workflow process with reference to data that corresponds to the parent workflow process in order to continue execution of the child workflow process, wherein the characteristic is a value of a field or a behavior of an action, wherein determining the undefined characteristic of the child workflow process comprises traversing the thread of execution in a reverse direction until the data is located that allows the undefined characteristic of the child workflow process to be defined, wherein traversing the thread of execution in the reverse direction comprises going back to previous actions starting at the fourth action in the order of the third action, the second action, and then the first action.

2. The business process management system of claim 1, wherein the workflow engine is configured to use the data to define the characteristic of the child workflow process.

3. The business process management system of claim 1, wherein the data corresponds to an action within the parent workflow process.

4. The business process management system of claim 3, wherein the workflow engine is configured so that, upon locating the data, the workflow engine:
   searches for additional data corresponding to one or more other actions that are positioned at a same level of the parent workflow process; and
   uses the additional data to define the characteristic of the child workflow process.

5. The business process management system of claim 1, further comprising:
   a workflow core, wherein the parent workflow process, the child workflow process, and the workflow engine are located on the workflow core;
   a plurality of core servers in electronic communication with the workflow core; and
   a plurality of nodes in electronic communication with the core servers.

6. A method for facilitating the reuse of a child workflow process with multiple parent workflow processes, comprising:
   during execution of the child workflow process within a thread of execution, determining, by a computing device, that a characteristic of the child workflow process is undefined, wherein the characteristic is a value of a field or a behavior of an action, wherein a parent workflow process comprises a first action and a second action, wherein the child workflow process comprises a third action and a fourth action, and wherein the actions are executed initially in the order of the first action, the second action, the third action and then the fourth action;
   in response, traversing, by the computing device, the thread of execution in a reverse direction until data that allows the characteristic to be defined is located, wherein traversing the thread of execution in a reverse direction until the data is located comprises going back to previous actions starting at the fourth action in the order of the third action, the second action, and then the first action; and
   using, by the computing device, the data to define the characteristic of the child workflow process in order to continue execution of the child workflow process.

7. The method of claim 6, wherein the data corresponds to an action within a parent workflow process that called the child workflow process.

8. The method of claim 7, further comprising, upon locating the data:
   searching for additional data corresponding to one or more other actions that are positioned at a same level of the parent workflow process; and using the additional data to define the characteristic of the child workflow process.

9. A non-transitory computer-readable medium comprising instructions that are executable to:
   during execution of a child workflow process within a thread of execution, determine that a characteristic of the child workflow process is undefined, wherein the characteristic is a value of a field or a behavior of an action, wherein a parent workflow process comprises a first action and a second action, wherein the child workflow process comprises a third action and a fourth action, and wherein the actions are executed initially in the order of the first action, the second action, the third action and then the fourth action;
   in response, traverse the thread of execution in a reverse direction until data that allows the characteristic to be defined is located, wherein traversing the thread of execution in a reverse direction until the data is located comprises going back to previous actions starting at the fourth action in the order of the third action, the second action, and then the first action; and
   use the data to define the characteristic of the child workflow process in order to continue execution of the child workflow process.

10. The computer-readable medium of claim 9, wherein the data corresponds to an action within a parent workflow process that called the child workflow process.

11. The computer-readable medium of claim 10, wherein upon locating the data the instructions are also executable to:
   search for additional data corresponding to one or more other actions that are positioned at a same level of the parent workflow process; and
   use the additional data to define the characteristic of the child workflow process.

* * * * *